United States Patent
Fischer et al.

(10) Patent No.: US 10,172,461 B2
(45) Date of Patent: Jan. 8, 2019

(54) FURNITURE DRIVE

(71) Applicant: Julius Blum GmbH, Hoechst (AT)

(72) Inventors: Florian Fischer, Hoechst (AT); Christof Goetz, Lustenau (AT); Elvis Music, Lindau (DE)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 15/616,285

(22) Filed: Jun. 7, 2017

(65) Prior Publication Data

US 2017/0265644 A1     Sep. 21, 2017

Related U.S. Application Data

(63) Continuation of application No. PCT/AT2015/000148, filed on Nov. 23, 2015.

(30) Foreign Application Priority Data

Jan. 2, 2015 (AT) ..................................... A 4/2015

(51) Int. Cl.
  *A47B 88/46*    (2017.01)
  *E05F 1/16*     (2006.01)
  (Continued)

(52) U.S. Cl.
  CPC .......... *A47B 88/467* (2017.01); *A47B 88/473* (2017.01); *A47B 88/497* (2017.01);
  (Continued)

(58) Field of Classification Search
  CPC ....... A47B 88/40; A47B 88/453; A47B 88/46; A47B 88/463; A47B 88/0477;
  (Continued)

(56) References Cited

U.S. PATENT DOCUMENTS

| 5,207,781 A | 5/1993 | Röck |
| 8,905,498 B2 | 12/2014 | Hammerle |

(Continued)

FOREIGN PATENT DOCUMENTS

| AT | 514666 | 2/2015 |
| CN | 1823653 | 8/2006 |

(Continued)

OTHER PUBLICATIONS

DE102013107562 Translated Description, corresponds to AT514666, 10 pages (Year: 2015).*
International Search Report dated Mar. 21, 2016 in International (PCT) Application No. PCT/AT2015/000148.
Search Report dated Oct. 2, 2015 in Austrian Application No. A 4/2015, with English translation.
English translation of Search Report issued in Chinese Application No. 2015800716090.

*Primary Examiner* — Andrew M Roersma
(74) *Attorney, Agent, or Firm* — Wenderoth, Lind & Ponack, L.L.P.

(57) ABSTRACT

A furniture drive for retracting a movably supported furniture part into a closed position relative to a furniture carcass includes a housing, an entrainment member which can be releasably coupled to the movable furniture part, a spring device for applying a force to the entrainment member, and a guide path arranged or formed on the housing. The entrainment member is displaceably arranged along the guide path, and the guide path includes a first bend for releasably locking the entrainment member. The guide path includes at least one second bend for releasably locking the entrainment member, and at least one movably-supported switch element with a first and with a second switching position is provided. The switch element, in the first switching position, blocks the first bend so that the entrainment member can move into the second bend and the switch (Continued)

element, in the second switching position, unblocks the first bend so that the entrainment member can move into the first bend.

19 Claims, 12 Drawing Sheets

(51) Int. Cl.
  *A47B 88/47* (2017.01)
  *A47B 88/49* (2017.01)
  *F03G 1/10* (2006.01)
  *F16C 29/00* (2006.01)
  *A47B 88/467* (2017.01)
  *A47B 88/473* (2017.01)
  *A47B 88/497* (2017.01)
(52) U.S. Cl.
  CPC .............. *E05F 1/16* (2013.01); *F03G 1/10* (2013.01); *F16C 29/005* (2013.01); *F16C 2314/72* (2013.01)
(58) Field of Classification Search
  CPC ..... A47B 88/467; A47B 88/047; A47B 88/47; A47B 88/0481; A47B 88/473; A47B 88/477; A47B 2088/4675; A47B 2088/0474
  See application file for complete search history.

(56) References Cited

U.S. PATENT DOCUMENTS

| | | |
|---|---|---|
| 2006/0186773 A1 | 8/2006 | Lam et al. |
| 2008/0231156 A1 | 9/2008 | Hoshide et al. |
| 2013/0088132 A1 | 4/2013 | Hammerle |

FOREIGN PATENT DOCUMENTS

| | | | | |
|---|---|---|---|---|
| CN | 103025204 | 4/2013 | | |
| EP | 0 391 221 | 10/1990 | | |
| EP | 2 208 440 | 7/2010 | | |
| WO | 2011/003739 | 1/2011 | | |
| WO | 2011/150432 | 12/2011 | | |
| WO | 2012/124706 | 9/2012 | | |
| WO | WO-2012159915 A1 * | 11/2012 | ............. | A47B 88/47 |
| WO | 2013/039269 | 3/2013 | | |
| WO | 2013/094523 | 6/2013 | | |

* cited by examiner

FURNITURE DRIVE

BACKGROUND OF THE INVENTION

The present invention relates to a furniture drive for retracting a movably supported furniture part into a closed position relative to a furniture carcass, including:
- a housing,
- an entrainment member which can be releasably coupled to the movable furniture part,
- a spring device for applying a force to the entrainment member, and
- a guide path arranged or formed on the housing. The entrainment member is displaceably arranged along the guide path, and the guide path includes a first bend for releasably locking the entrainment member.

The invention further relates to an arrangement with a furniture drive of the type to be described and with an ejection device for ejecting the movable furniture part. The movable furniture part can be ejected, starting from the closed position, towards an open position by the ejection device. Moreover, the invention refers to a drawer pull-out guide with such a furniture drive or with an arrangement of the aforementioned type.

Furniture drives in the form of retraction devices (for example as known in EP 391 221 B1) are in particular employed with drawers or sliding doors which are freely displaceable over a large region of their extension path, which are engaged at the end of the closing movement by an entrainment member of the retraction device, and which are being pulled into the closed end position by the force of a spring. When the movable furniture part is being opened, an operator firstly needs to apply a pulling force against the resistance of the spring until the entrainment member, after a predetermined distance, moves into a bend of the guide path, whereby the movable furniture part is decoupled from the entrainment member. By way of the bend, the entrainment member is releasably locked in an arrested, self-locking parking position, and the spring device is in a tensioned condition and therewith located in a ready position for the next retraction process. The retraction path of the movable furniture part until the end of the closed end position is thereby constant.

From the earlier, however post-published AT 514666 A2, a furniture drive of the particular type has become known, in which the entrainment member has an adjusting device by which it can be chosen whether the entrainment member can be displaced along at least two guide paths having a different length. In this way, an adjustment of the length of the retraction path of the entrainment member with different pre-stressing conditions of the spring device is made possible. In the function of the adjusting device, a peg is provided on the entrainment member which engages either the first or the second guide path. The entrainment member is thereby somewhat complex to manufacture, because the adjustment device in the form of the peg is an inherent part of the entrainment member. Moreover, because of the displaceable peg, the entrainment member can solely be guided at one side (i.e. only at one side of the housing), so that there is the danger that the entrainment member can be tilted in an undesired manner.

SUMMARY OF THE INVENTION

It is an object of the present invention to propose a furniture drive of the type mentioned in the introductory part, thereby avoiding the above drawbacks.

According to the invention, it is thus provided that the guide path includes at least one second bend for releasably locking the entrainment member, and at least one movably-supported switch element with a first and with a second switching position. The switch element, in the first switching position, blocks the first bend so that the entrainment member can move into the second bend, and the switch element, in the second switching position, unblocks the first bend so that the entrainment member can move into the first bend.

In other words, the guide path includes at least two bends, which are spaced from each other in a longitudinal direction of the housing, for releasably locking the entrainment member. The movement of the entrainment member into the bends, upon opening the movable furniture part, can be optionally controlled by a movably-supported switch element which is separate from the entrainment member. In a first position of the switch element, the first bend is being blocked so that the entrainment member can move into the second bend. On the contrary, in a second position of the switch element, the first bend is unblocked so that the entrainment member moves into the first bend.

By way of the at least two bends, the entrainment member can be optionally locked relative to the housing on at least two positions deviating from one another. By way of the two different locking positions of the entrainment member, two retractions paths of different length of the entrainment member and two different spring forces, respectively, for retracting the movable furniture part are also available.

In this way, the retraction path of the entrainment member and the force exerted by the spring device acting on the movable furniture part can be variably adjusted. When having a small drawer, for example, a relatively short retraction path is sufficient. When having a larger and heavier loaded drawer, the drawer, because of its weight and the occurring friction, may remain in an open position even before reaching the fully closed end position. By an enlargement of the retraction path (i.e. by an enlargement of the relative distance between the two end positions of the entrainment member), the drawer can be retracted over a larger retraction path with higher spring force.

It is thereby not mandatory that the switch element, in the first switching position, completely blocks the first bend. Instead, it is sufficient when the switch element, in the first switching position, is positioned in such a way so as to prevent a movement of the entrainment member into the first bend.

According to an embodiment, the switch element, in the first switching position, can block the first bend by obstructing, so that a movement of the entrainment member into the first bend is prevented. The switch element, in the first switching position, is thus positioned in such a way that the first bend, upon pulling out the entrainment member, is at least partially blocked or obstructed, respectively, by the switch element and therewith a movement of the entrainment member into the first bend is prevented.

According to an alternative embodiment, the switch element can be arranged laterally next to the guide path and can deflect, in the first switching position, the entrainment member in such a way that a movement of the entrainment member into the first bend is prevented. In this embodiment, the switch element is thus located laterally besides or outside the guide path and prevents, by deflecting or redirecting the entrainment member which is being moved towards the extension direction, from being moved into the first bend.

Within the frame of the present invention, the term "bends" is not only understood to include curved-shaped bends, but also angled chamfers of the guide path.

A further advantage of the present invention lies in the fact that such a furniture drive is equipped with an additional ejection device for ejecting the movable furniture part, starting from a closed position, towards an open position. Such an ejection device frequently has at least one, preferably lockable, energy storage member which can be released by a Touch-Latch mechanism. These Touch-Latch-systems are particularly used when the movable furniture parts (for example because of aesthetical reasons) do not have a gripping handle. Thereby, the ejection device can be unlocked by manually applying a pressure force or a pulling force to the closed furniture part. The movably-supported furniture part is ejected by the force of the energy storage member (preferably an ejection spring) towards an open position. Subsequently, a person can further move the slightly opened furniture part by gripping behind the front plate (also without the arrangement of a gripping handle) towards the extension direction.

When now a furniture drive with a retraction functionality and an ejection device are combined with one another, there is frequently a problem that the operating force of the retraction spring and the operating force of the ejection spring run in opposite directions and thereby obstruct each other. By an adjustment of the switch element, it is now possible to shorten the retraction path of the entrainment member when using an ejection device in conjunction, so that the energy storage member of the ejection device needs only to overcome a respective shorter retraction path of the entrainment member and thus also a reduced force of the spring device of the first furniture drive.

When using an additional ejection device, it is however necessary to load the energy storage member thereof which is frequently effected upon the retraction movement of the movable furniture part. The force for loading the ejection spring, however, is acting against the force of the retraction movement of the movable furniture part, so that an excessively long retraction path could lead to the result that the movable furniture part cannot be retracted into the fully closed position. By an adjustment of the switch member into the second switching position, this problem can be solved, because a shortened retraction path of the furniture drive can be provided. Due to the shortened retraction path, the energy storage member of the ejection device can be fully loaded, and the movable furniture part can be safely retracted into the fully closed position by the closing force of the furniture drive.

The switch element can be switched, for example, by a manual actuation or by an actuation with a tool between the first and second switching position. According to an embodiment, it is alternatively also possible that the switch element can be switched between the first and the second switching position by mounting an ejection device for ejecting the movable furniture part. The ejection device is to be connected to the housing of the furniture drive in a retrofitting manner. Alternatively, the switch element can also include an electromechanical switch or an electronic switch (for example a transistor).

BRIEF DESCRIPTION OF THE DRAWINGS

Further details and advantages of the present invention will be explained with reference to following description of figures, in which.

DETAILED DESCRIPTION OF THE INVENTION

Figure 1:
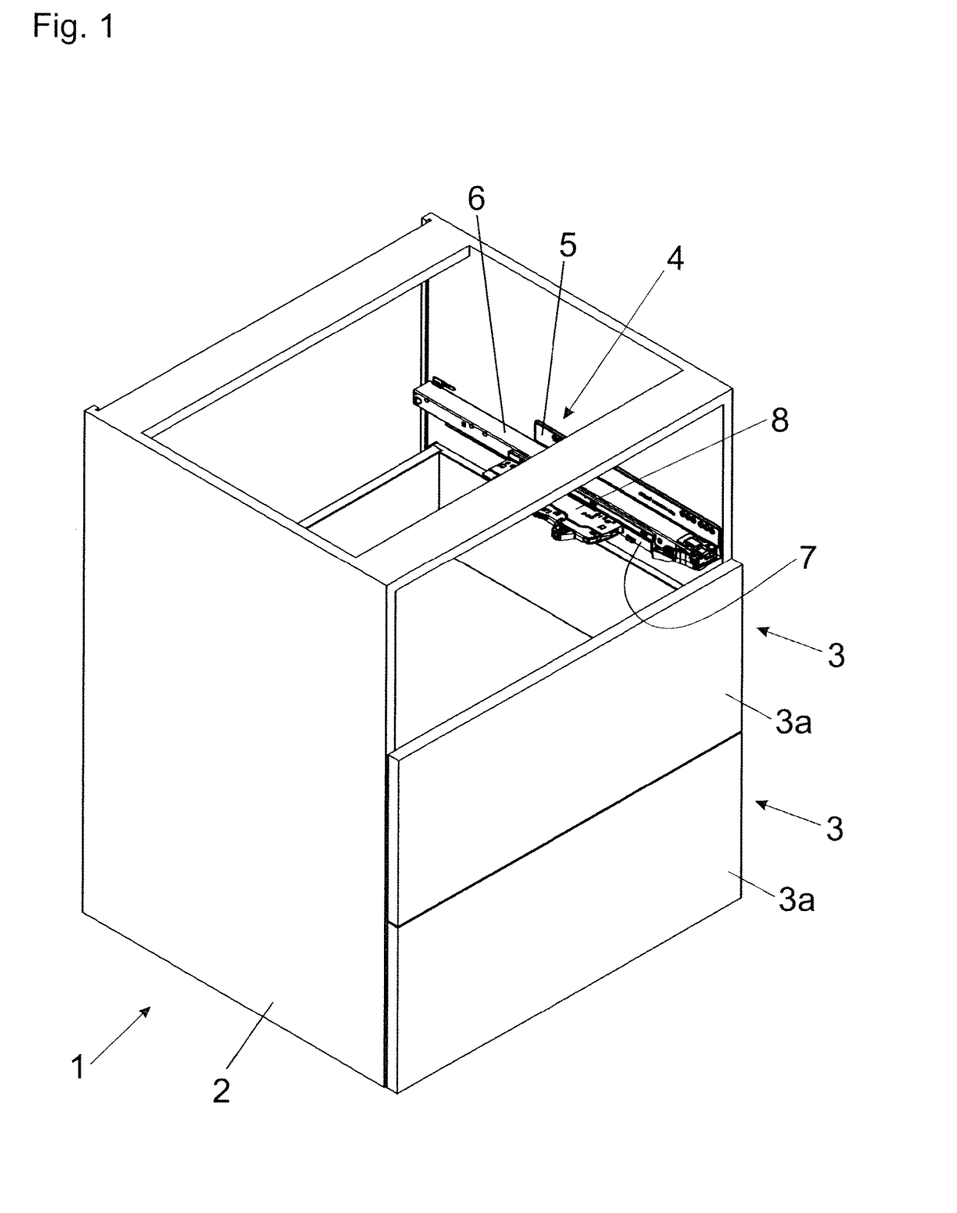
FIG. 1 is a perspective view of an item of furniture having a furniture carcass and drawers being displaceable thereto.

FIG. 1 shows a perspective view of an item of furniture 1 having a furniture carcass 2, wherein movable furniture parts 3 in the form of drawers 3a can be displaced by drawer pull-out guides 4 relative to the furniture carcass 2. The drawer pull-out guides 4 include a carcass rail 5 to be fixed to the furniture carcass 2 and at least one extension rail 6 which is displaceably supported relative to the carcass rail 5. By way of a furniture drive 7, the movable furniture 3 can be pulled into a closed position relative to the furniture carcass 2. Moreover, an ejection device 8 is provided by which the movable furniture part 3 can be ejected, starting from a closed position, towards an open position.

Figures 2A, 2B:
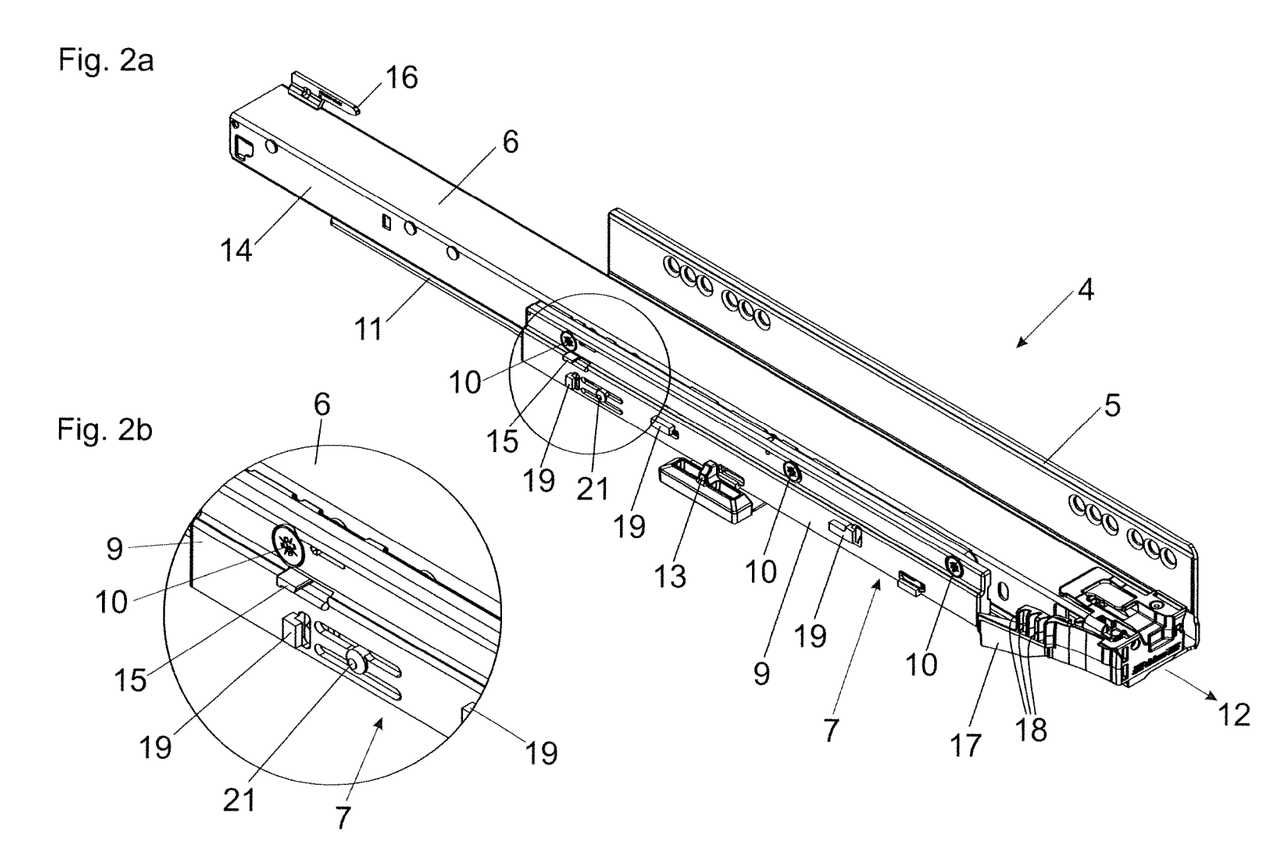
FIG. 2a, 2b are perspective views of a drawer pull-out guide and an enlarged detail view thereof.

FIG. 2a is a perspective view of the drawer pull-out guide 4 with the carcass rail 5 and the extension rail 6, between which a middle rail 11 is arranged in order for the extension to be lengthened. In the shown figure, the drawer pull-out guide 4 is located in a closed position so that the extension rail 6 can be pulled towards the opening direction 12. The extension rail 6 has a U-profile in a cross-section, wherein a housing 9 of the furniture drive 7 is mounted by way of fastening means, preferably in the form of screws, to a lateral limb 14 of the extension rail 6. By way of the furniture drive 7, the extension rail 6 can be pulled into the closed end position at the end of the closing movement. The furniture drive 7 includes a switch element 15 which is movably mounted relative to the housing 9, the switch element 15 can be switched, preferably displaced or pivoted, between at least two switching positions. By switching the switch element 15, an entrainment member 30 (FIG. 4*a*) of the furniture drive 7 can be pulled into the closed end position of the entrainment member 30 over at least two distances having a different length. In FIG. 2*a*, the switch element 15 is in a first switching position in which a long retraction path for the entrainment member 30 (and therewith for the extension rail 6) is provided. FIG. 2*b* shows the encircled section of FIG. 2*a* in an enlarged view.

For fastening the rear-sided end of the drawer 3*a*, a hook 16 is provided on the extension rail 6 which, in the mounting position, protrudes into a bore arranged in the back side of the drawer rear wall. For fastening of the front-sided end of the drawer 3*a*, a coupling lever 17 to be operated manually is provided on the front-sided end of the extension rail 6, and the coupling lever 17 has latching edges which, due to a resilient configuration of the coupling lever 17, can be automatically latched in a releasable manner to a carrier rail which is mounted to the drawer 3*a*. Moreover, the housing 9 of the furniture drive 7 has a plurality of hooks 19 which can engage in corresponding recesses of the ejection device 8. For the play-free arrangement, at least one protrusion 21 is formed on the housing 9 of the furniture drive 7, and the protrusion 21 rests against the housing 22 of the ejection device 8 in the mounting position. On the stationary carcass rail 5, an ejection catch 13 is attached which can be coupled to the ejection device 8.

Figures 3A, 3B, 3C:
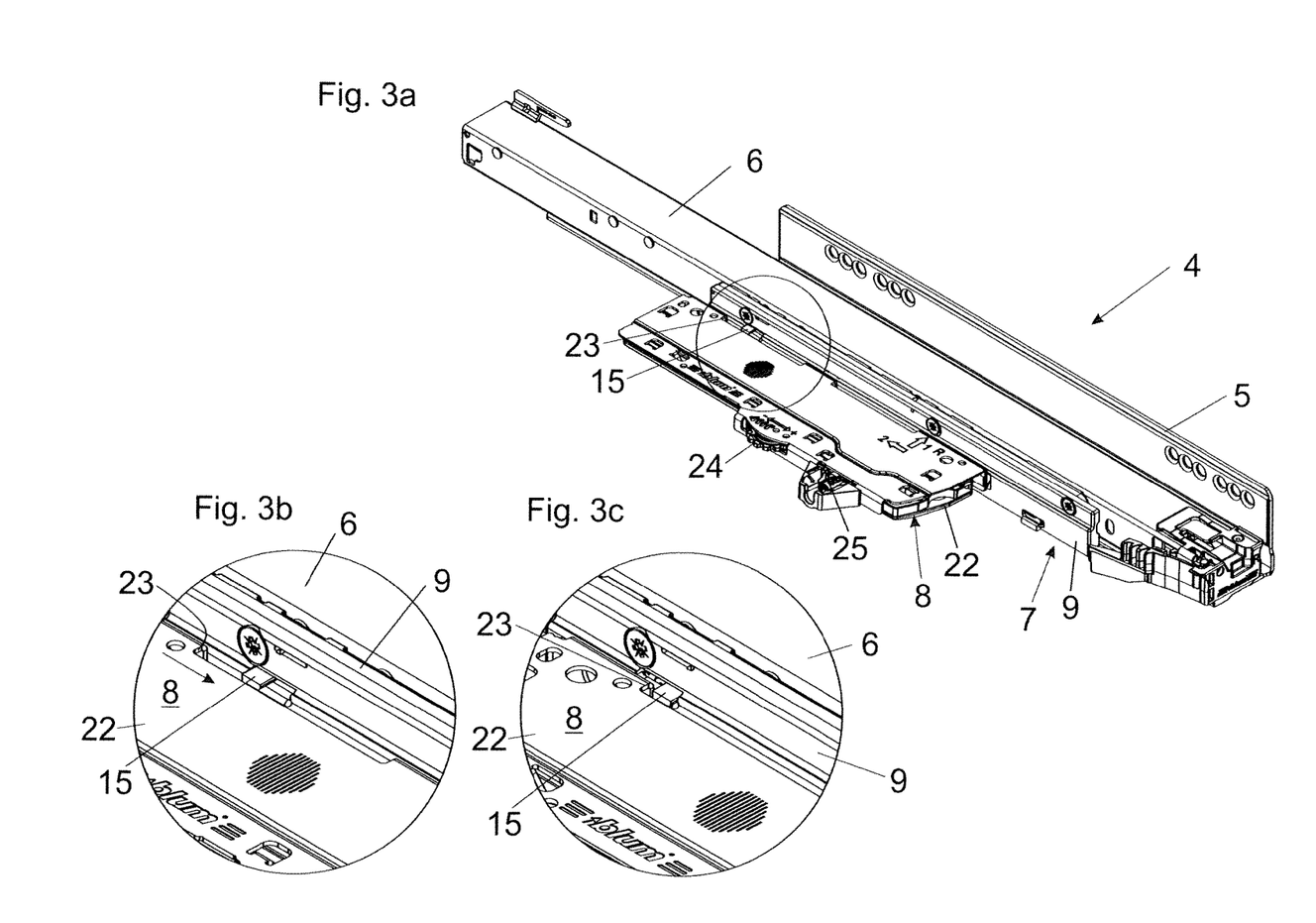
FIG. 3a-3c are perspective views of the drawer pull-out guide with a furniture drive for retracting a movable furniture part into the closed position, an ejection device to be mounted thereon and two enlarged detail views of said mounting.

FIG. 3*a* shows the drawer pull-out guide 4 with the furniture drive 7 fixed to the extension rail 6. A housing 22 of the ejection device 8 can be releasably fixed to the housing 9 of the furniture drive 7. The ejection device 8 includes an adjusting wheel 24 by which the position of the drawer 3*a*, in the closed position, can be variably adjusted. Moreover, the ejection device 8 includes a rotatable portion 25 by which a movement of the ejection device 8 can be synchronized with a movement of a second ejection device 8 which is arranged on an opposing side of the furniture carcass 2.

FIG. 3*a* and the enlarged detail view according to FIG. 3*b* show that the housing 22 of the ejection device 8 is pre-positioned relative to the housing 9 of the furniture drive 7 by way of the hooks 19 shown in FIG. 2*a*, and the housing 22 of the ejection device 8 has a stop 23 for actuation of the switch element 15. Starting from the pre-position shown according to FIG. 3*a* and FIG. 3*b*, the housing 22 of the ejection device 8, by manually applying pressure in a direction of the depicted arrow, can be displaced relative to the housing 9 of the furniture drive 7, so that the stop 23 displaces the switch element 15, starting from the first switching position, to the right into the second switching position according to FIG. 3*c*. In the second switching position shown in FIG. 3*c*, a reduced retraction path of the entrainment member 30 (FIG. 4*a*) of the furniture drive 7—in comparison with the first switching position—is provided, so that the energy storage member of the ejection device 8, when ejecting the drawer 3*a* starting from the closed position, needs only to overcome a reduced retraction path of the entrainment member 30 and a reduced force of the spring device 29, respectively.

Figure 4A:
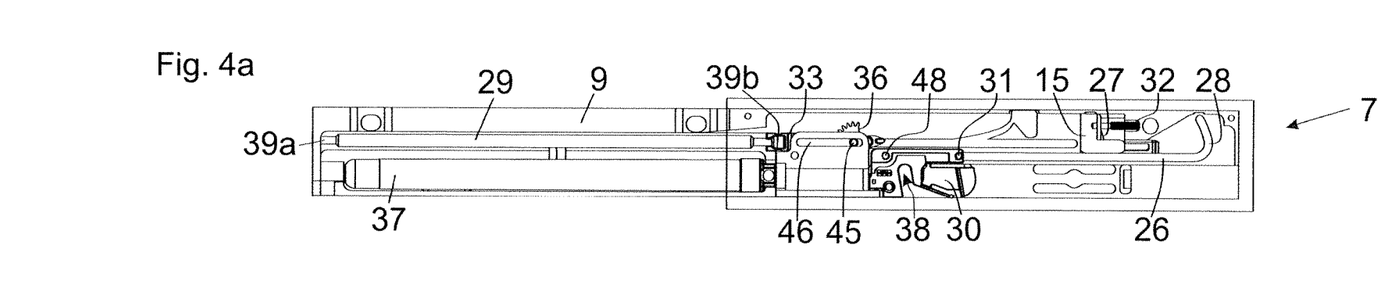
FIG. 4a-4c are side views of the furniture drive with the entrainment member in the closed position, an enlarged detail view thereof, and a view with components being partially hidden.

FIG. 4*a* shows a side view of the furniture drive 7, wherein a guide path 26 with at least two bends 27, 28 which are spaced from each other in a longitudinal direction of the housing 9 are arranged or formed on the housing 9. The switch element 15 being movably arranged on the housing 9 is thereby located in the first switching position, so that the first bend 27 is blocked. An entrainment member 30—which is acted upon by a spring device 29 and which can be releasably coupled to the movable furniture part 3—is displaceably guided by way of at least one guiding element 31 along the guide path 26. The spring device 29 preferably includes at least one tension spring and is fixed by a first fastening location 39*a* to the housing 9 and by a second fastening location 39*b* to a spring holder 33 being separate from the entrainment member 30, and the spring holder 33 is motionally coupled to the entrainment member 30 by a coupling device 35 (FIG. 4*c*). The entrainment member 30 has a notch 38 for releasably coupling a coupling element (preferably an entrainment peg) being fixed to the extension rail 6 or to the movable furniture part 3. By way of the two bends 27 and 28, the entrainment member 30 can be releasably latched in an alternative manner to two different positions relative to the housing 9. The spring device 29, in a position in which the entrainment member 30 is releasably latched to the first bend 27, is tensioned to a less extent in comparison to a position in which the entrainment member 30 is releasably latched to the second bend 28. The first bend 27 and the second bend 28 run parallel to each other at least over a region. The switch element 15 can be pushed by a spring element 32 into the first switching position in which the bend 29 is blocked, wherein the spring element 32 is separate from the spring device 29. In this way, a longer retraction path for the entrainment member 30 is provided by default. The spring-assisted retraction movement of the entrainment member 30 (and therewith of the movable furniture part 3) can be dampened by a damping device 37, preferably a hydraulic piston-cylinder-unit.

Figure 4B:
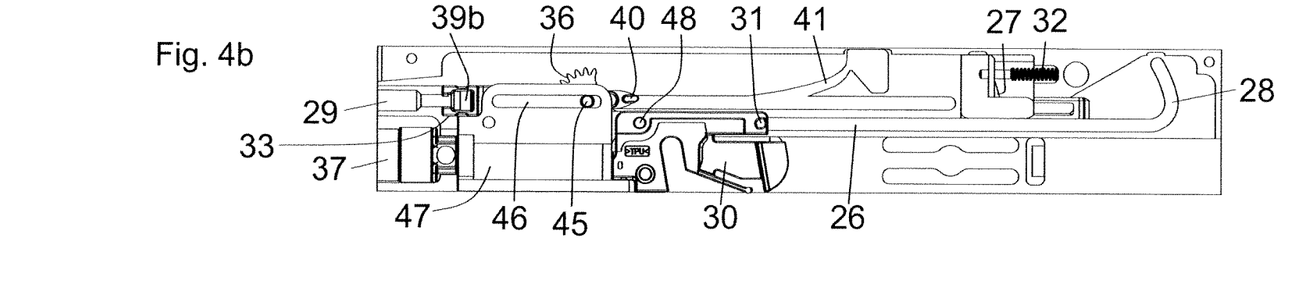
Figure 4C:
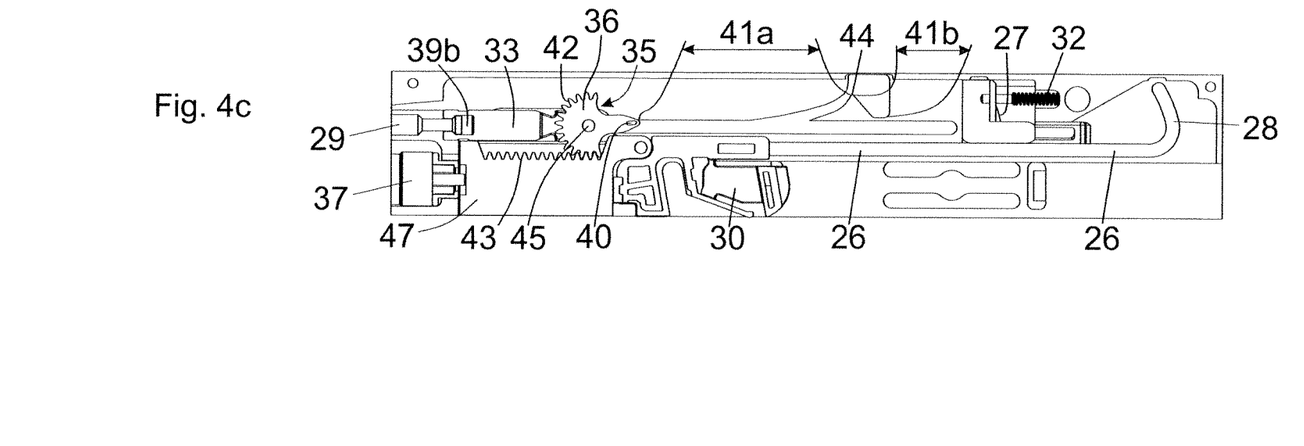

FIG. 4*b* shows the encircled region of FIG. 4*a* in an enlarged view. In the shown embodiment, the entrainment member 30 is connected, preferably about a pivoting axis 48, to a displaceable slider 47, and the coupling device 35 includes a tilting portion 36 which is pivotally supported about a bolt 45. The bolt 45 is arranged on the spring holder 33 and is glidingly supported along an elongated hole 46 of the slider 47. The tilting portion 36 has at least one guide portion 40 which is displaceably guided along a control curve 41.

FIG. 4*c* shows the detail view according to FIG. 4*b*, wherein the elongated hole 46 of the slider 47 is not depicted. The coupling device 35 includes the pivotally mounted tilting portion 36, wherein a first tooth arrangement 42 of the tilting portion 36 interengages with a second tooth arrangement 43 of the slider 47. By way of the coupling device 35, the fastening location 39*b* of the spring device 29 falls back relative to a position of the entrainment member 30 which is being moved towards the opening direction, so that at the end of the tensioning path, the movement of the fastening location 39*b* of the spring device 29 is slower than the movement of the entrainment member 30. The spring device 29 is thereby loaded with a reduced effort, the undesired spring separation force and an unduly acceleration of the movable furniture part 3 associated therewith upon decoupling the entrainment member 30 from the movable furniture part 3 can thereby be prevented. The control curve 41 for guiding the tilting portion 36 includes a first section 41*a* and a second section 41*b* which are connected to each other by an apex 44.

FIG. 5*a*-5*d* show the extension process of the entrainment member 30 in temporal sequences. Starting from the closed position according to FIG. 4*a*-4*c*, the entrainment member 30 can initially be guided along a linearly extending section 26*a* (FIG. 8) of the guide path 26 by manually applying a pulling force to the movable furniture part 3. The entrainment member 30 is pivotally connected to the displaceable slider 47 by a pivoting axis 48, wherein the tooth arrangement 43 of the slider 47 meshes with the tooth arrangement 42 of the tilting portion 36. The tilting portion 36 is hingedly connected to the spring holder 33 being connected via the fastening location 39*b* to the spring device 29. The tilting portion 36 has a guide portion 40 which can be guided along the control curve 41. In FIG. 5*a*-5*d*, the switch element 15 is in the first switching position, and thus the first bend 27 is blocked for a run-in of the entrainment member 30, so that the entrainment member 30 is therefore guided along the longer guide path 26 and, subsequently, can be releasably locked to the second bend 28.

Figure 5A:
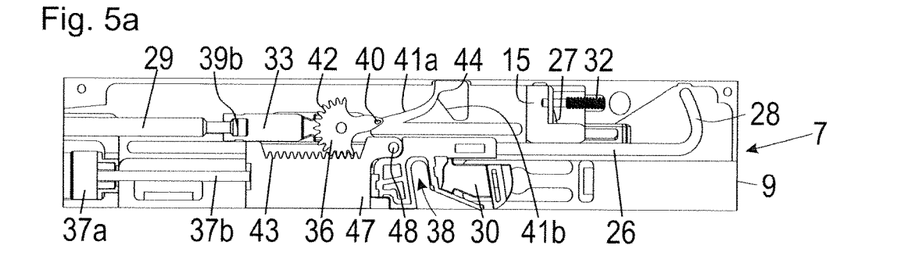
FIG. 5a-5d show the extension process of the entrainment member in temporal sequences, wherein the switch element is located in the first switching position and thereby blocks the first bend of the guide path.
Figure 5B:
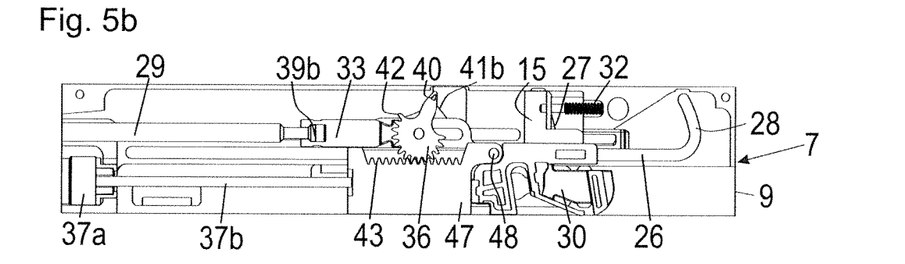

In FIG. 5*b*, the entrainment member 30 is arranged in a slightly extended position, wherein the guide portion 40 of the tilting portion 36 is located on the apex 44 of the control curve 41. The fastening location 39*b* of the spring device 29 on the spring holder 33 initially moves with the same speed than the entrainment member 30 which is being moved towards the extension direction.

Figure 5C:
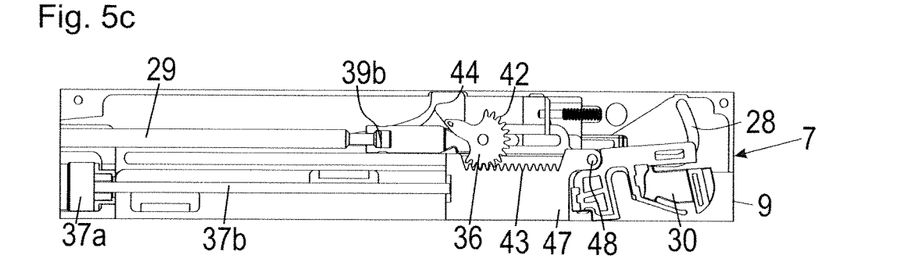

In FIG. 5*c*, the entrainment member 30 is even further extended, wherein the guide portion 40 of the tilting portion 36, in the first switching position of the switch element 15, can be guided along the sections 41*a* and 41*b* of the control curve 41. The fastening location 39*b*, by the interengagement of the tooth arrangements 42, 43 and by a pivoting movement of the tilting portion 36, starts to continuously decelerate, so that the spring device 29 is not tensioned to the maximum spring deflection.

Figure 5D:
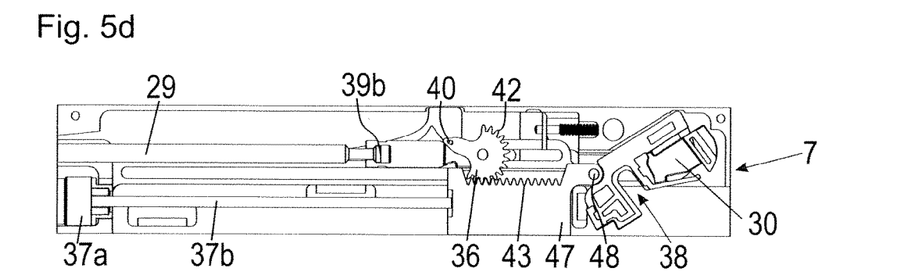

In FIG. 5*d*, the entrainment member 30 has been pivoted about the pivoting axis 48 by way of the interaction with the second bend 28, so that the entrainment member 30 is locked to the second bend 28 and is located therewith in an arrested, self-locking ready position. By the pivoting movement of the entrainment member 30, a coupling element (not shown) of the extension rail 6 is being released, so that the movable furniture part 3 can be further displaced towards the open position in an uncoupled manner. Starting from the position according to FIG. 5*d*, the coupling element, when the movable furniture part 3 is being closed, can again release the entrainment member 30 out of its arrested, self-locking ready position, whereupon the entrainment member 30, together with the movable furniture part 3, can be pulled into the closed position by the force of the spring device 29. By way of a damping device 37 having a cylinder 37*a* and a piston rod 37*b* which is displaceable thereto, the free end of the piston rod 37*b* loosely abuts the displaceable slider 47, and the spring-assisted retraction movement of the entrainment member 30 can be dampened.

Figure 6A:
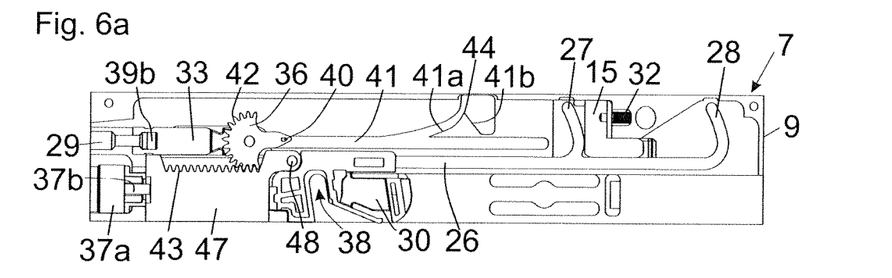
FIG. 6a-6d show the extension process of the entrainment member in temporal sequences, wherein the switch element is located in the second switching position and thereby releases the first bend of the guide path so as to enable a run-in for the entrainment member.

FIG. 6*a* shows the furniture drive 7, wherein the switch element 15, which is displaceably mounted relative to the housing 9, has been moved into the second switching position. Thus, the first guide path 27 is released for a run-in of the entrainment member 30. The switching of the switch element 15 can be effected solely mechanically, preferably by the retrofitted mounting of the ejection device 8 (FIG. 3*b*, 3*c*) to the housing 9 of the furniture drive 7. It is visible that the spring element 32 is in a compressed condition, so that when the ejection device 8 is being removed, the switch element 15 is automatically moved back into the first switching position by the force of the relaxing spring element 32. In FIG. 6*a*, the entrainment member 30 is located in the retracted end position, and the spring device 29 is in a relaxed condition.

Figure 6B:
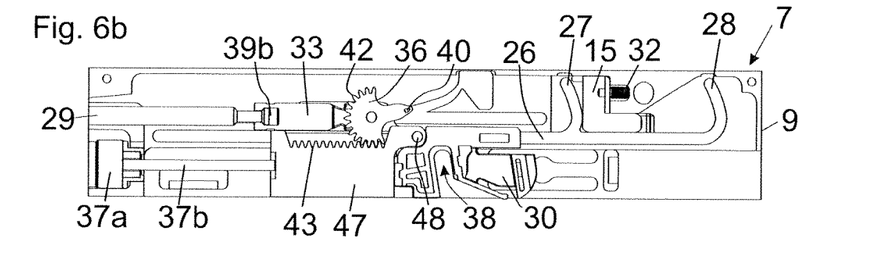

FIG. 6*b* shows that the entrainment member 30, by applying a manual pulling force to the movable furniture part 3, can firstly be moved along a linear extending section 26*a* (FIG. 8) of the guide path 26. By way of the coupling device 35 with the tilting portion 36, the tooth arrangement 42 of which interacts with the tooth arrangement 43 of the displaceable slider 47, a force-reduction mechanism is realized. Thus, the fastening location 39*b* of the spring device 29 on the spring holder 33, when the entrainment member 30 is pulled out, falls back to the position of the entrainment member 30 which is moving towards the opening direction. The tilting portion 36 has a guide portion 40 which can be displaceably guided along the control curve 41 (FIG. 6*a*).

Figure 6C:
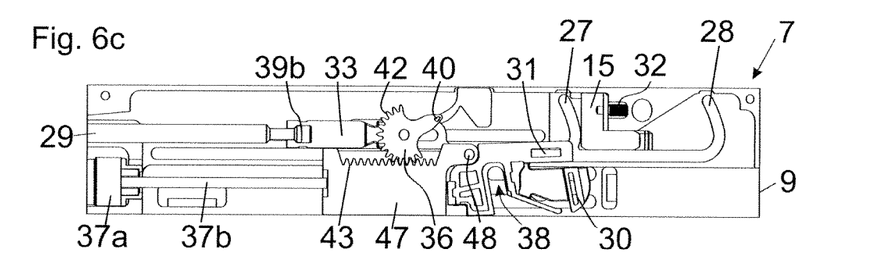

FIG. 6*c* shows, in comparison to FIG. 6*b*, a further extended tensioning position of the entrainment member 30. By way of an asymmetric linkage of the spring device 29 on the fastening location 39*b*, the guide element 40 of the entrainment member 30 has a tendency to deflect laterally in a direction towards the first bend 27, so that the entrainment member 30 is not further being moved towards the second bend 28. The first bend 27 and the second bend 28 can run parallel to each other at least over a region.

Figure 6D:
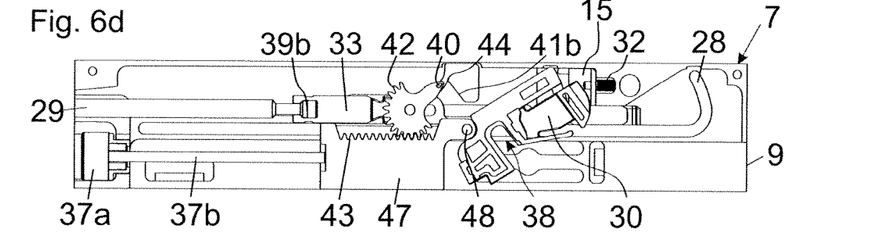

In FIG. 6*d*, the entrainment member 30 is releasably locked to the first bend 27, wherein a coupling element being connected to the extension rail 6 is being released by the pivoting movement of the entrainment member 30 about the pivoting axis 48. The spring device 29, in the shown position in which the entrainment member 30 is locked to the first bend 27, is tensioned to a less extent as in a position in which the entrainment member 30 is releasably locked to the second bend 28. By the at least two positions of the switch element 15, at least two retraction paths having a different length are provided for the entrainment member 30 and at least two different retraction forces of the spring device 29 are available.

Figure 7:
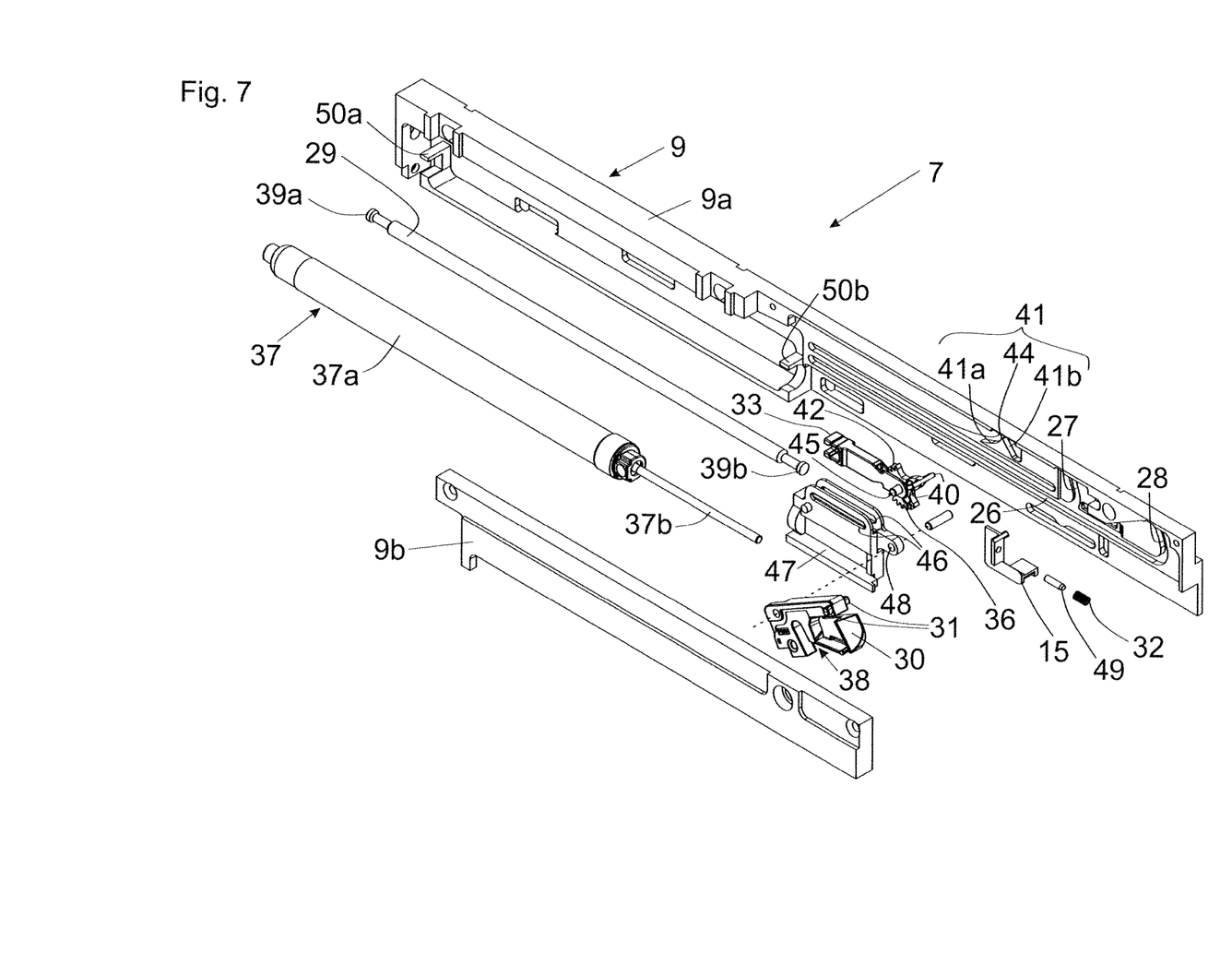
FIG. 7 shows the furniture drive in an exploded view.

FIG. 7 shows the furniture drive 7 in an exploded view. The housing 9 includes two housing portions 9*a* and 9*b* to be connected to one another, wherein the guide path 26 for the entrainment member 30 with the two bends 27, 28 which are spaced from each other in the longitudinal direction of the housing 9 are formed on the housing portions 9*a*, 9*b*. Moreover, a control curve 41 for the tilting portion 36 is formed on the housing 9, the control curve 41 includes a first section 41*a* and a second section 41*b* which are connected to each other by the apex 44. For releasably fastening the damping device 37, resilient holders 50*a* and 50*b* are provided on the housing 9, wherein the cylinder 37*a* can be snapped to the holders 50*a*, 50*b*. The spring device 29 is connected by a first fastening location 39*a* to the housing 9 and by way of a second fastening location 39*b* to the spring holder 33 which is displaceably guided via a bolt 45 along an elongated hole 46 of the slider 47. A tilting portion 36 having a tooth arrangement 42 is connected to the spring holder 33, the tooth arrangement 42 interacts with a tooth arrangement 43 (not shown) of the slider 47. The entrainment member 30 is hingedly connected to the slider 47 by a pivoting axis 48. The entrainment member 30 has guide elements 31 by which the entrainment member 30 can be guided along the guide path 26 of the housing 9 and by which the entrainment member 30 can be releasably locked to the two bends 27 and 28. The entrainment member 30 has a notch 38 for releasably coupling the movable furniture part 3. The switch element 15 which is movable between two switching positions is arranged on a bearing element 49 and is pushed into the first switching position by the spring element 32 in which the first bend 27 is being blocked. In this way, a longer retraction path for the entrainment member 30 is provided by default (i.e. without the attachment of the ejection device 8). The switch element 15 separate from the entrainment member 30 can also have a receiving element for a tool, wherein the switch element 15 can be switched between the two switching positions by an actuation of the tool. The switch element 15 can also have a two-part or a multi-part configuration, and a first part to be actuated is motionally coupled to a second part for blocking the bend 27.

Figure 8:
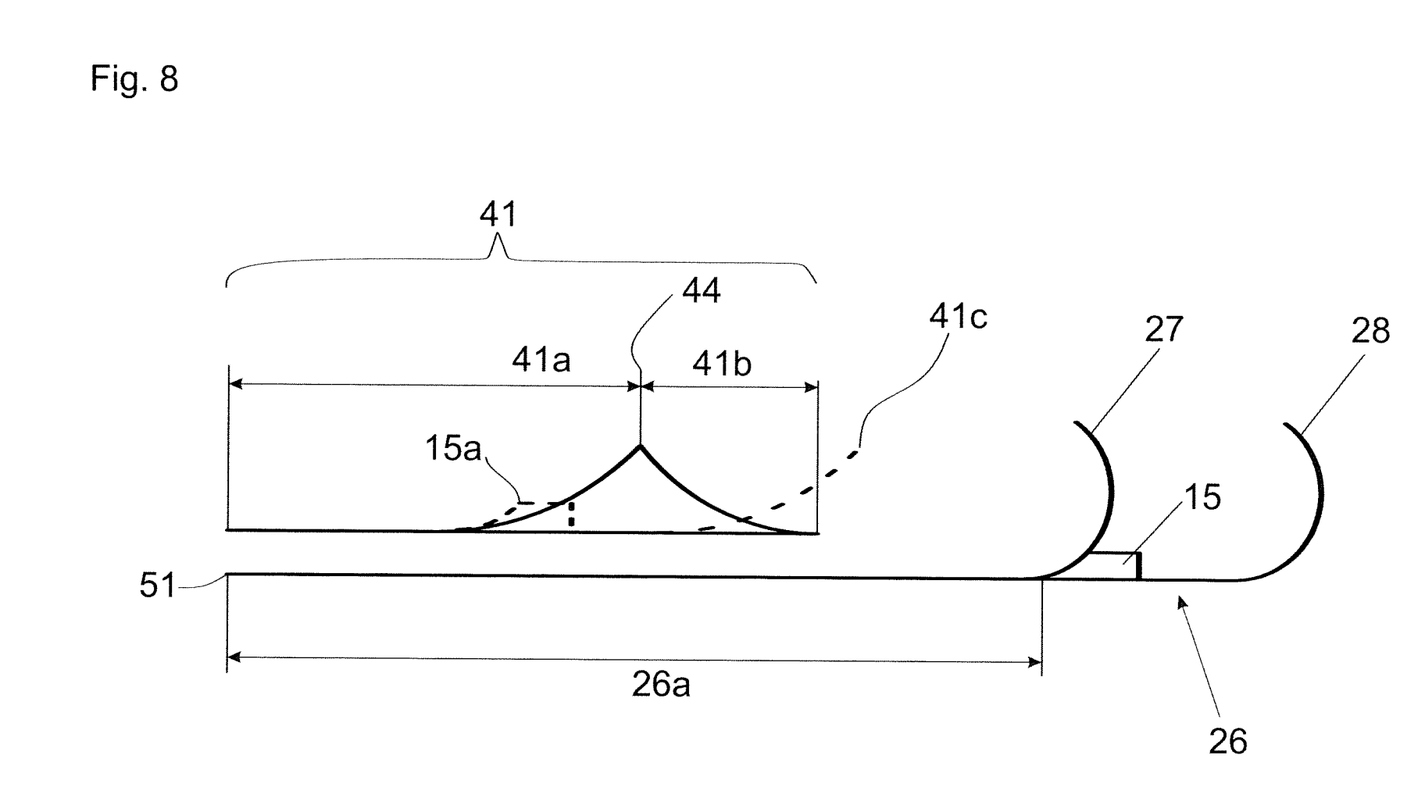
FIG. 8 shows the guide path for the entrainment member and the control curve for the rocker member of the force reduction mechanism in a schematic view.

FIG. 8 shows very schematically the progression of the guide path 26 which, starting from the retracted position 51 of the entrainment member 30, includes a linear displacement path 26a and at least two bends 27, 28 being spaced from each other in longitudinal direction for releasably locking the entrainment member 30. In the first switching position of the switch element 15, the first bend 27 is blocked so that the entrainment member 30, when the spring device 29 is being tensioned, runs into the second bend 28. The control curve 41 for guiding the tilting portion 36, on the contrary, includes a first section 41a and a second section 41b which are connected to each other by the apex 44. When now two bends 27, 28 being spaced from are provided, the control curve 41, theoretically, would need an additional third section 41c which is spaced from the second section 41a in longitudinal direction. Moreover, the run-in of the tilting portion 36 into the first section 41a or alternatively into the third section would need to be controlled by an additional switch element 15a. However, by the provision of the second section 41b adjoining the first section 41a, the third section 41c as well as the additional switch element 15a can be omitted, so that a single switch element 15 is sufficient both for the selection of the bends 27, 28 and the corresponding length of the control curve 41. With both displacement paths of the entrainment member 30 into the bends 27, 28, the force reduction is proportional to the path. In the first switching position of the switch element 15 in which the first bend 27 is blocked, the tilting portion 36 can be guided along the first section 41a and the second section 41b. On the contrary, when the switch element 15 is in the second switching position in which the first bend 27 is cleared, the tilting portion 36 can exclusively be guided along the first section 41a of the control curve 41.

Figure 9A:
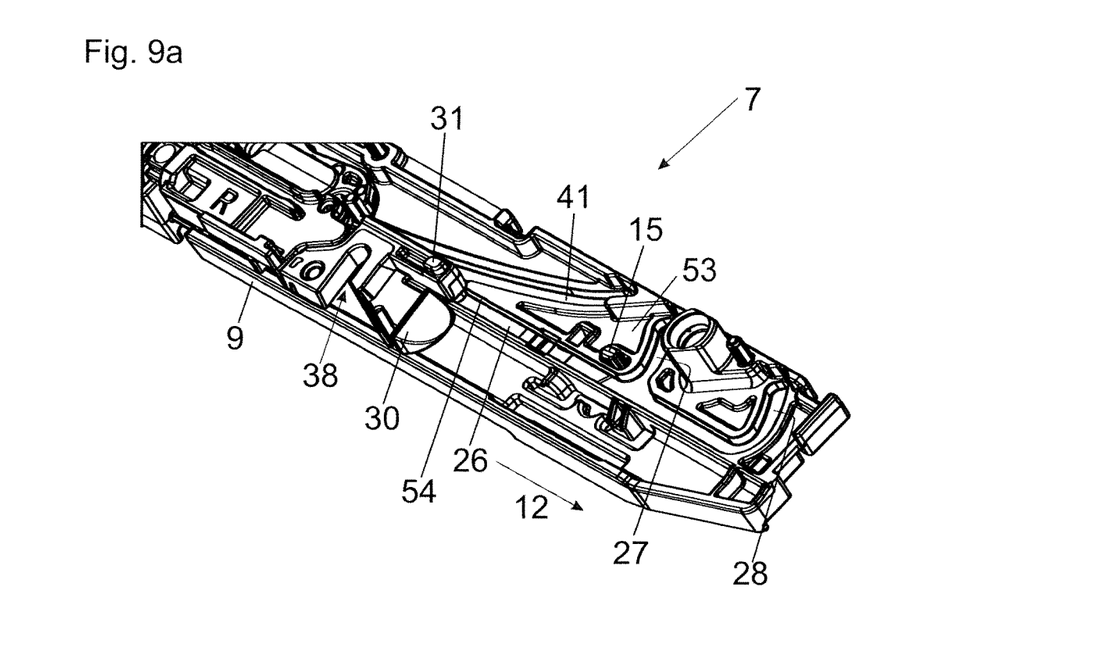
FIG. 9a, 9b shows a furniture drive in a slightly modified embodiment, wherein the switch element, in the first switching position, deflects the entrainment member in such a way that a run-in of the entrainment member into the first bend is prevented.

FIG. 9a shows a furniture drive 7 in a slightly modified embodiment, wherein the switch element 15 is laterally arranged besides the guide path 26 and, in the first switching position, deflects the entrainment member 30 in such a way that a run-in of the entrainment member 30 into the first bend 27 is prevented. Contrary to the previous embodiment in which the switch element 15, in the first switching position, partially or fully blocks the first bend 27 in order to prevent a run-in of the entrainment member 30 into the first bend 27, the movable switch element 15, with this embodiment, is now located laterally besides or outside of the guide path 26. The switch element 15 includes a movable protrusion which, in the first switching position (FIG. 9a), protrudes from a base 53 of the housing 8 and, in the second switching position, runs substantially flush with the base 53 of the housing 9 and thereby allows a movement of the entrainment member 30 into the first bend 27. Also in this case, as already explained, the switch element 15 can be switched between the first switching position and the second switching position by mounting and unmounting an ejection device 8 which is to be retrofitted to the housing 9 of the furniture drive 7.

Figure 9B:
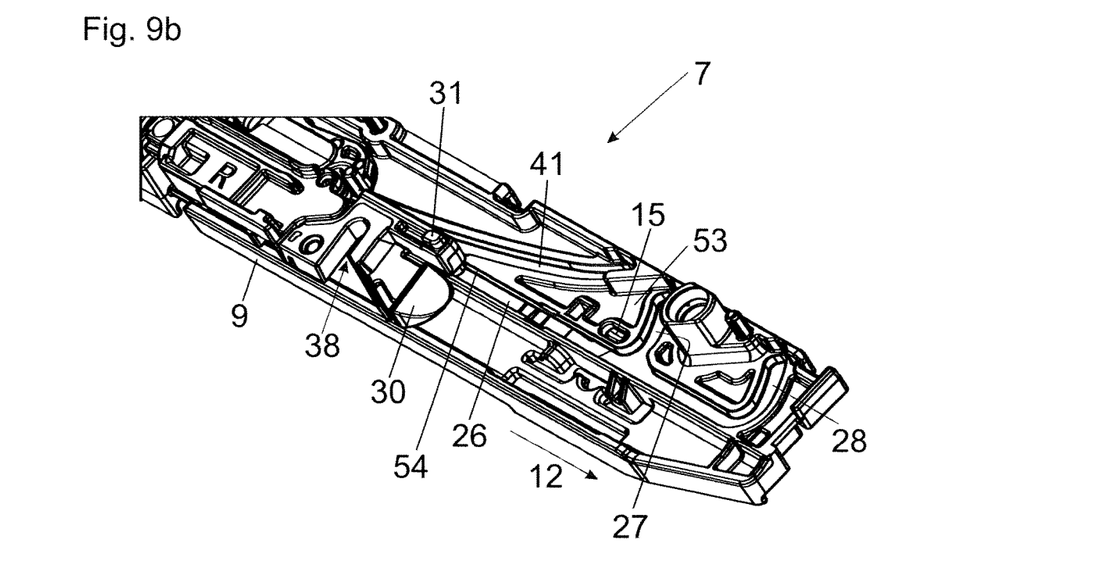

FIG. 9b shows the furniture drive 7 with the switch element 15 in the second switching position, so that the entrainment member 30, upon an extension movement towards the opening direction, runs into the second bend 27. As in the previous embodiments, the entrainment member 30, upon an extension movement towards the opening direction 12, runs into the first bend 27 (when the switch element 15 is in the second switching position), because the entrainment member 30 is being pressed by the force of the spring device 29 against the side wall 54 of the guide path 26 with a force running transverse to the opening direction 12.

Figure 10A:
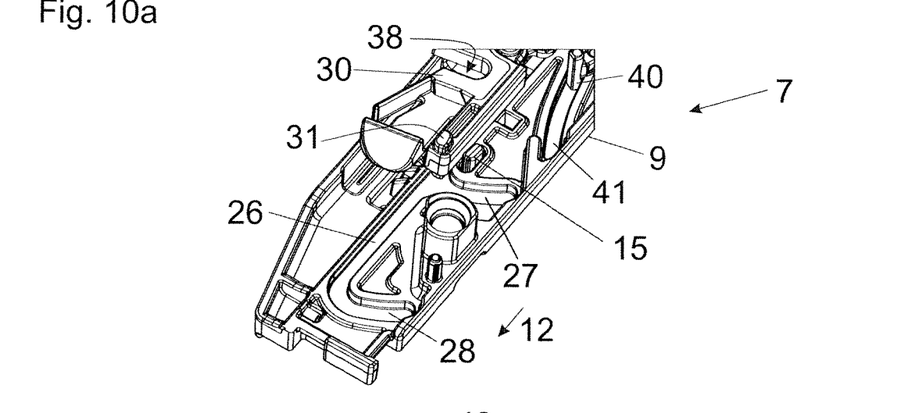
FIG. 10a-10c are partial section views according to FIG. 9a, 9b with different positions of the entrainment member in the extension direction, wherein the switch element is located in the first switching position.
Figures 10B, 10C:
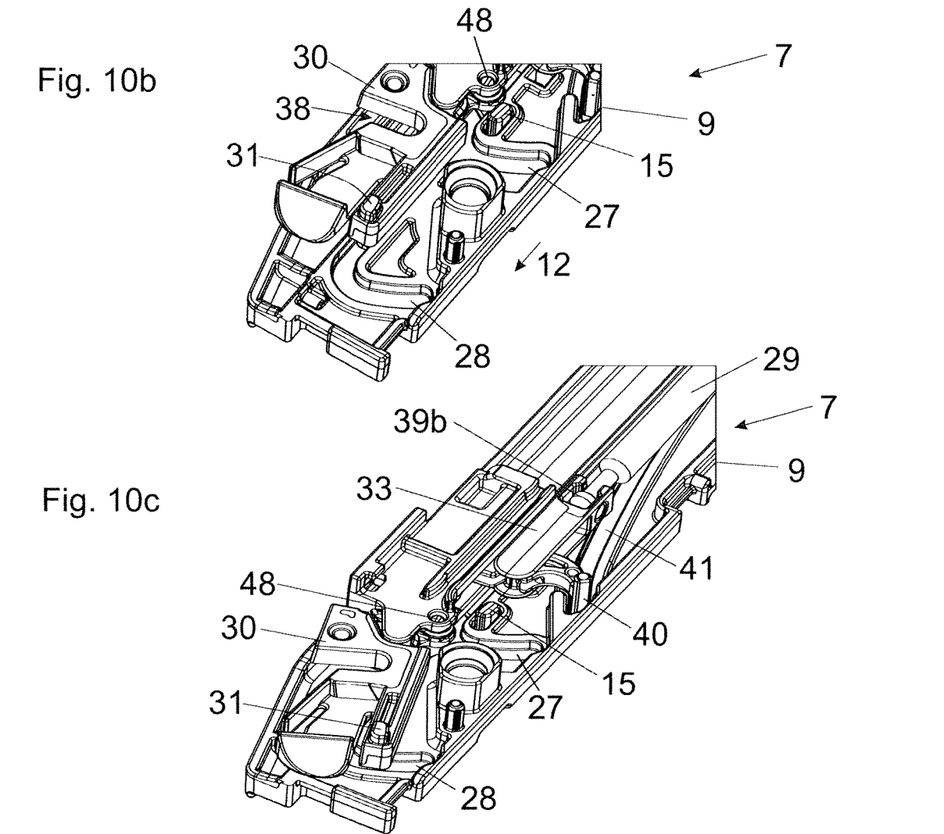

FIG. 10a-10c show a partial section of the furniture drive 7 with different positions of the entrainment member 30 along the extension direction 12. According to FIG. 10a, the switch element 15, which is movably arranged on the housing 9, is in the first switching position in which a run-in of the entrainment member 30 into the first bend 27 is prevented. The movable switch element 15 is thereby arranged laterally besides the guide path 29 and deflects, in the first switching position, the entrainment member 30 such that a run-in of the entrainment member 30 is not possible upon an extension towards the extension direction 12. Thus, the entrainment member 30—as shown in FIG. 10b—is diverted past the first bend 27, and the guide element 31 of the entrainment member 30 runs into the second bend 28 and thereby pivots the entrainment member 30 about the pivoting axis 48. By the pivoting movement of the entrainment member 30 about the pivoting axis 48, the movable furniture part 3 is decoupled from the entrainment member 30 and can be moved further towards the extension direction 12. When the movable furniture part 3 is again closed, the entrainment member 30 is released from the locked position relative to the second bend 28 and is pulled, together with the movable furniture part 3, into the closed position by the force of the spring device 29.

Figure 11A:
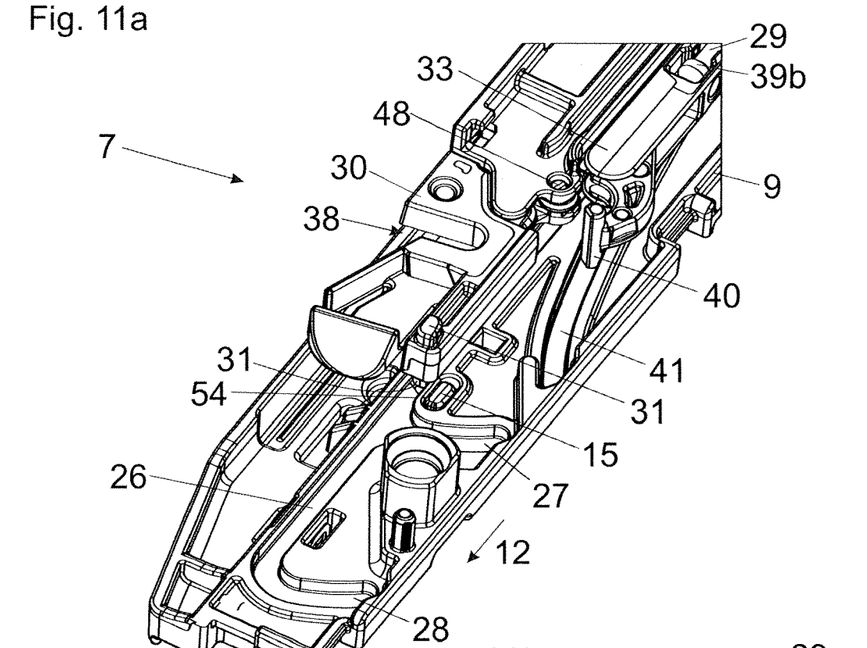
FIG. 11a, 11b are partial section views of the furniture drive according to FIG. 9a, 9b with two different positions of the entrainment member, wherein the switch element is located in the second switching position.
Figure 11B:
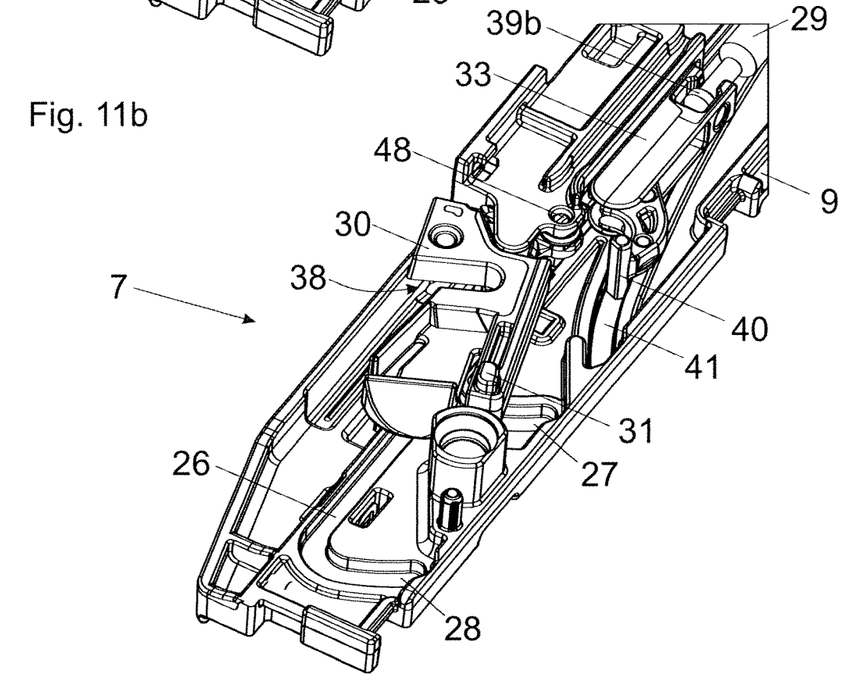

FIG. 11a and FIG. 11b each show a partial section of the furniture drive 7, in which the switch element 15 movably mounted to the housing 9 is located in the second switching position. In the second switching position, the switch element 15 is countersunk so far that the switch element 15 does not hinder a movement of the entrainment member 30. As the two guide elements 31 of the entrainment member 30 are pressed against the side wall 54 of the guide path 26 by the force of the spring device 29, the entrainment member 30 runs into the first bend 27 upon a movement towards the extension direction 12. By a run-in of the guide elements 41 into the first bend 27, the entrainment member 30 is pivoted about the pivoting axis 48 and releases the movable furniture part 3. FIG. 11b shows the entrainment member 30 being releasably locked to the first bend 27. By the two guide elements 31 protruding transversely from the entrainment member 30, the entrainment member 30 can be guided between two housing portions 9a, 9b (FIG. 7) of the housing 9 on both sides, whereby an undesired tilting of the entrainment member 30 between the two housing portions 9a, 9b of the housing 9 is prevented.

Figure 12A:
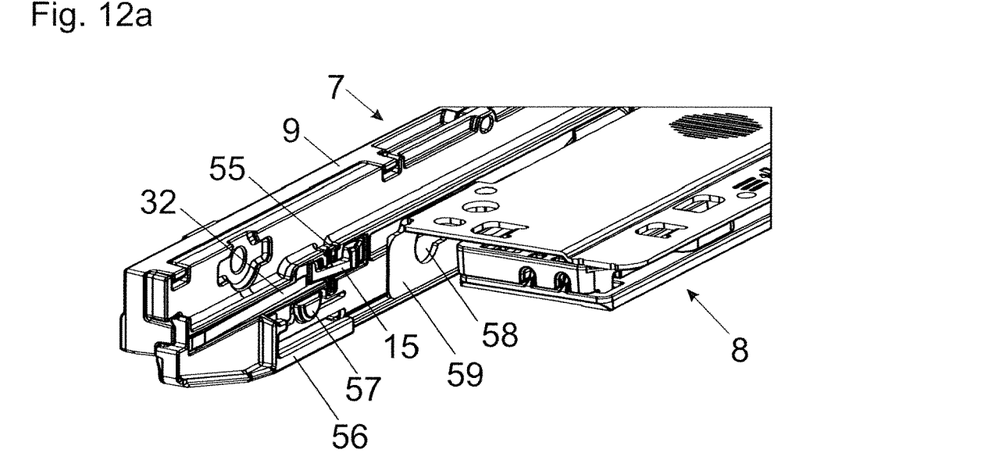
FIG. 12a-12c shows the mounting process of an ejection device to the furniture drive, whereby the switch element can be switched from the first switching position into the second switching position.
Figure 12B:
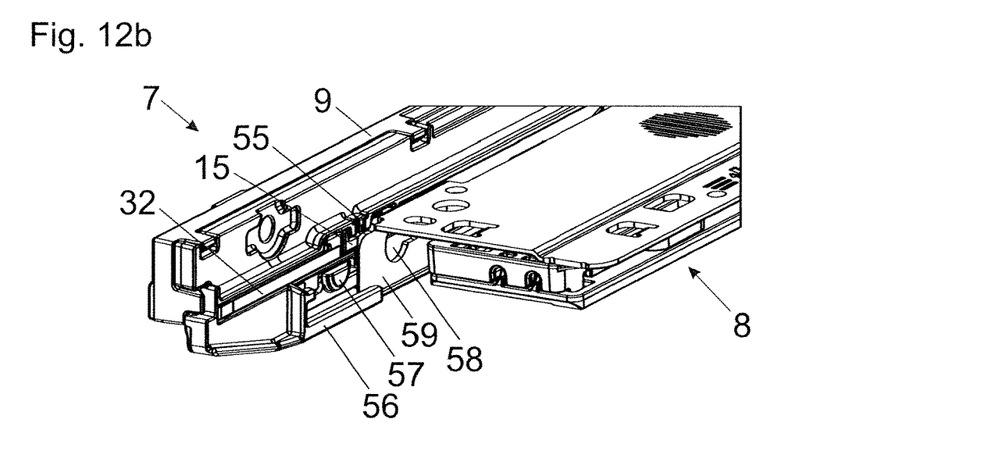
Figure 12C:
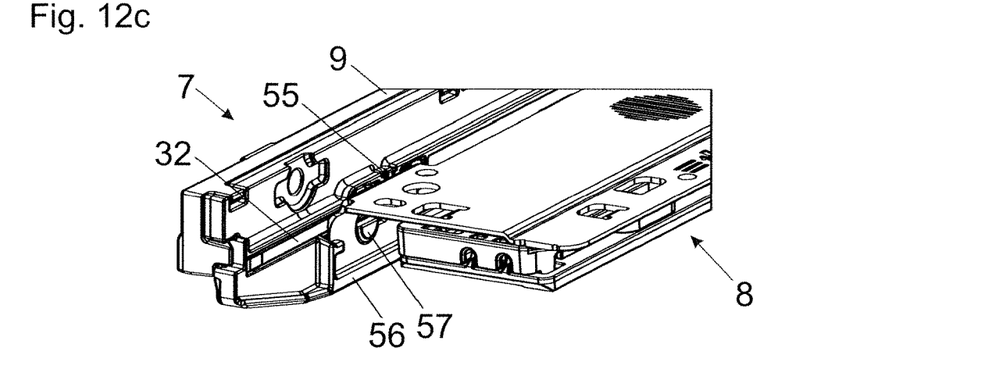

FIG. 12a-12c show the mounting of the ejection device 8 to the furniture drive 7, whereby due to the mounting, the switch element 15 can be switched, starting from the first switching position, into the second switching position. The switch element 15 is movably mounted to the housing 9 and, in the shown embodiment, is configured as a rocker which is pivotally mounted about a vertical extending axis 55 in the mounting position. The switch element 15 is held by a predetermined force of the spring element 32 (for example in the form of a leaf spring) in the first switching position, so that the entrainment member 30, when the ejection device 8 is not mounted, can be locked to the second bend 28 of the guide path 26, so that a longer retraction path for the entrainment member 30 with a greater retraction force of the spring device 29 can be provided. The housing 9 of the furniture drive 7 has at least one guide 56 extending in the longitudinal direction of the housing 9 in which a limb 59 of the ejection device 8 can be inserted. The ejection device 8 is thus pushed into the guide 56 by the limb 59, and the switch element 15 is pivoted about the vertically extending axis 55 and therewith switched into the second switching position, so that the entrainment member 30 runs into the first bend 27. In this way, a shorter retraction path of the entrainment member 30 with a reduced retraction force of the spring device 29 is available. When the limb 59 is fully pushed into the guide 56, then at least one latching element 57 (preferably a knob) of the housing 9 of the furniture drive 7 can be releasably latched to a corresponding recess 58 of the limb 58 of the ejection device 8. In this way, the ejection device 8 is fixed with a predetermined holding force in a longitudinal direction of the housing 9.

The invention claimed is:

1. A furniture drive for retracting a movably supported furniture part into a closed position relative to a furniture carcass, comprising:
   a housing;
   an entrainment member to be releasably coupled to the movable furniture part;
   a spring device for applying a force to the entrainment member;
   a guide path on the housing, wherein the entrainment member is displaceably arranged along the guide path, and the guide path includes a first bend for releasably locking the entrainment member,
   and a second bend for releasably locking the entrainment member, and
   a movably-supported switch element with a first switching position and with a second switching position, the switch element being configured such that, in the first switching position, the switch element blocks the first bend so that the entrainment member can move into the second bend, and such that, in the second switching position, the switch element unblocks the first bend so that the entrainment member can move into the first bend.

2. The furniture drive according to claim 1, wherein the switch element is further configured such that, in the first switching position, the switch element blocks the first bend by obstructing, so that a run-in of the entrainment member into the first bend is prevented.

3. The furniture drive according to claim 1, wherein the switch element is laterally arranged next to the guide path and, in the first switching position, deflects the entrainment member in such a way that a run-in of the entrainment member into the first bend is prevented.

4. The furniture drive according to claim 1, wherein the switch element is movably mounted to the housing.

5. The furniture drive according to claim 1, further comprising a spring element separate from the spring device and configured to press the switch element into the first switching position.

6. The furniture drive according to claim 1, wherein the first bend and the second bend are spaced from each other in a longitudinal direction of the housing.

7. The furniture drive according to claim 1, wherein the first bend and the second bend run parallel to each other at least over a region.

8. The furniture drive according to claim 1, wherein the spring device is further configured such that, in a position in which the entrainment member is releasably locked to the first bend, the spring device is tensioned less than in a position in which the entrainment member is releasably locked to the second bend.

9. The furniture drive according to claim 1, wherein the spring device is configured to be tensioned by a spring holder separate from the entrainment member, the furniture drive further comprising a coupling device for motionally coupling the entrainment member and the spring holder, wherein a fastening location of the spring device on the spring holder, when the entrainment member is being pulled out, falls back relative to a position of the entrainment member by the coupling device.

10. The furniture drive according to claim 9, wherein the entrainment member is connected to a displaceable slider, the coupling device including a tilting portion connected to the spring holder, the tilting portion having a first tooth arrangement, the coupling device further including a second tooth arrangement arranged on the slider, the first tooth arrangement and the second tooth arrangement being connected to one another.

11. The furniture drive according to claim 10, wherein the tilting portion is guided along a control curve.

12. The furniture drive according to claim 11, wherein the control curve includes a first section and a second section connected to one another by an apex of the control curve.

13. The furniture drive according to claim 12, wherein the tilting portion is configured such that, in the first switching position of the switch element in which the first bend is blocked, the tilting portion can be guided along the first section and along the second section of the control curve.

14. The furniture drive according to claim 12, wherein the tilting portion is configured such that, in the second switching position of the switch element in which the first bend of the guide path is unblocked, the tilting portion can be guided exclusively along the first section of the control curve.

15. The furniture drive according to claim 1, wherein the switch element is configured to be switched by a manual actuation between the first switching position and the second switching position.

16. The furniture drive according to claim 1, wherein the switch element is configured to be switched between the first switching position and the second switching position by mounting an ejection device for ejecting the movable furniture part, the ejection device being retrofitted to the housing of the furniture drive.

17. An arrangement having the furniture drive according to claim 1 for retracting the movably supported furniture part into the closed end position and an ejection device for ejecting the movably supported furniture part, starting from the closed position, towards an open position.

18. A drawer pull-out guide comprising:
   a carcass rail to be mounted to a furniture carcass,
   at least one extension rail displaceably mounted relative to the carcass rail, and
   the furniture drive according to claim 1.

19. A drawer pull-out guide comprising:
   a carcass rail to be mounted to a furniture carcass,
   at least one extension rail displaceably mounted relative to the carcass rail, and
   the arrangement according to claim 17.

* * * * *